(12) United States Patent
Koenig

(10) Patent No.: US 7,266,509 B2
(45) Date of Patent: Sep. 4, 2007

(54) SYSTEM AND METHOD FOR COMBINING INTERACTIVE GAME WITH INFOMERCIAL

(76) Inventor: Eric Koenig, 543 McKinnley Ter., Centerport, NY (US) 11721

( * ) Notice: Subject to any disclaimer, the term of this patent is extended or adjusted under 35 U.S.C. 154(b) by 0 days.

(21) Appl. No.: 11/435,365

(22) Filed: May 16, 2006

(65) Prior Publication Data

US 2006/0293958 A1    Dec. 28, 2006

Related U.S. Application Data

(60) Division of application No. 10/637,653, filed on Aug. 11, 2003, now Pat. No. 7,054,831, which is a continuation of application No. 09/610,676, filed on Jul. 7, 2000, now abandoned.

(60) Provisional application No. 60/201,920, filed on May 4, 2000, provisional application No. 60/143,049, filed on Jul. 7, 1999.

(51) Int. Cl.
| | |
|---|---|
| G06Q 30/00 | (2006.01) |
| A63F 9/24 | (2006.01) |
| A63F 13/00 | (2006.01) |
| G06F 17/00 | (2006.01) |
| G06F 19/00 | (2006.01) |

(52) U.S. Cl. .............................. 705/14; 463/1; 463/42; 463/40; 463/41; 463/30; 463/16; 463/25; 705/1; 705/26; 705/27

(58) Field of Classification Search .................. 705/14, 705/1, 26, 27; 463/1, 40, 42, 30, 16, 25
See application file for complete search history.

(56) References Cited

U.S. PATENT DOCUMENTS 5,018,975 A * 5/1991 Todd .......................... 434/128

5,916,024 A * 6/1999 Von Kohorn ................ 463/40

(Continued)

FOREIGN PATENT DOCUMENTS

GB     2141907    * 1/1985

(Continued)

OTHER PUBLICATIONS

Raymond Serafin, "Cars find ad power in computers; Disks go to young, affluent men"; NEWS;p. 12: Jun. 14, 1993.*

(Continued)

*Primary Examiner*—Jean D. Janvier
(74) *Attorney, Agent, or Firm*—Mitchell A. Stein

(57) ABSTRACT

A combination multi-media interactive game and video infomercial acts as an advertising business method wherein a seller of merchandise can combine both an advertising infomercial with a player and/or participant's playing an interactive game. Preferably, the game is a step-by-step strategic or random game, whereby a player and/or participant user starts at an opening "starting point" and proceeds from one interval location to another. At each interval location, the player and/or participant is interactively interfaced with one or more commercial infomercials so that the player-participant can interact with the infomercial by researching, observing and/or demonstrating the use of the products remotely, or, by shopping for the displayed products by Internet. At each infomercial the retail object for sale is related to the predetermined themes of each interval location.

1 Claim, 6 Drawing Sheets

U.S. PATENT DOCUMENTS

| | | |
|---|---|---|
| 6,163,153 A | 12/2000 | Reiderman et al. ......... 324/314 |
| 6,215,304 B1 | 4/2001 | Slade ......................... 324/303 |
| 6,247,542 B1 | 6/2001 | Kruspe et al. ................ 175/40 |
| 6,291,995 B1 | 9/2001 | Speier et al. ............... 324/303 |
| 6,326,784 B1 | 12/2001 | Ganesan et al. ......... 324/303.4 |
| 6,331,775 B1 | 12/2001 | Thern et al. ................ 324/303 |
| 6,366,089 B1 | 4/2002 | Poitzsch et al. ............ 324/303 |

FOREIGN PATENT DOCUMENTS

| | | |
|---|---|---|
| WO | WO93/22017 | * 11/1993 |
| WO | WO98/51384 | * 11/1998 |

OTHER PUBLICATIONS

"Advertisers begin to discover the possibilities, pitfalls of multimedia": Nov. 20, 1995.*

Minson, John, "A sponsored sell that takes the biscuit (advertisements in interactive games; online)": The Guardian: Sep. 1, 1994.*

* cited by examiner

SYSTEM AND METHOD FOR COMBINING INTERACTIVE GAME WITH INFOMERCIAL

CROSS REFERENCE TO RELATED APPLICATIONS

This application is a divisional of application Ser. No. 10/637,653, filed Aug. 11, 2003 now U.S. Pat No. 7,054,831, which is a continuation of application Ser. No. 09/610,676, filed Jul. 7, 2000 now abandoned and claims benefit under 35 U.S.C. 120 therefrom. This application also claims the benefit under 35 USC 119(e) of U.S. Provisional Application Nos. 60/143,049, filed Jul. 7, 1999, and 60/201,920, filed May 4, 2000.

BACKGROUND OF THE INVENTION

1. Field of the Invention

The present invention relates to a system and method for combining a multi-media interactive game or story with product advertisements, such as an infomercial. A seller of merchandise can advertise and sell products to participants during playing of the interactive game or story, and the players are afforded the opportunity to earn or win points, discounts, coupons, etc., that can be applied toward product purchases.

2. Description of the Prior Art

Interactive multi-media games are known where players are presented with a series of decision opportunities as they make there way through a thematic video game or story setting. For example, many video games on now available where players take on the form a character in a three dimensional video setting, and move through different scenes using various commands. Along the way, the player usually is afforded the opportunity to score points through execution of various types of tasks requiring variable levels of player skill. Decisions as to which of several paths to take are also often presented to the players. Popular examples of these types of games include MYST, DARK FORCES and STREET FIGHTER.

Meanwhile, television commercials known as "Infomercials" have become very popular in recent years where a half-hour long television program is actually a presentation that tries to sell a product, with demonstrations, customer testimonials, pricing information, ordering by mail information, music, etc. The Internet has also opened up a whole new avenue for the advertising and sale of products and services. Product manufactures and advertisers are nevertheless always searching for new and better ways to market products and services.

The following U.S. patents are exemplary of prior art that relates generally to the foregoing technologies.

U.S. Pat. No. 5,848,399 discloses a computer system for allowing a purchaser and/or participant to purchase packaged goods at home.

U.S. Pat. No. 5,682,196 discloses a hyper-television system for integrating remote participants into a multimedia program.

U.S. Pat. No. 4,592,546 discloses a game of skill, such as football, playable by remote purchaser-participants in conjunction with a live event, such as a football game.

U.S. Pat. No. 5,813,913 discloses a game of skill, such as a television quiz show, playable by remote purchasers and/or participants in conjunction with a common game event where purchasers and/or participants are grouped as to skill level.

U.S. Pat. No. 5,830,067 describes a proxy player machine that enables users to participate in a game of random chance even though a user is not present at the site of the game. The device is located at a site where a game of chance takes place. A proxy player remotely purchases wagering chances, plays those chances, and reports the results of those games of chance to clients who are not present at the site where the game takes place. The proxy player may make gaming decisions according to the player's preferences. The device enables persons to remotely participate in games of chance, such as bingo.

U.S. Pat. No. 5,816,918 discloses a prize redemption system for games wherein in exchange for monetary input, prize credits are credited to a player based on the game outcome. A prize selection menu is displayed wherein the player may select a prize that has a prize cost within the player's prize credit amount. The player is dispensed a specific prize ticket that is redeemable for the selected prize.

To date, no known systems or methods exist that seek to combine the attributes of interactive games or stories with those of infomercials wherein a player or participant in the game or story is provided with selectable information during the game or story that relates to a vendor's products.

SUMMARY OF THE INVENTION

The present invention provides a combination multi-media interactive game and infomercial, wherein a player and/or participant user is required to access and research product information as the interactive multi-media game is played. More particularly, at various intervals or levels of the game, the player and/or participant interfaces with an infomercial type advertising and product information stream that promotes goods and services that are thematically related to the game content at each interval. The result is a unique and entertaining approach to product marketing wherein potential purchasers not only enjoy learning about the advertised products, but also can earn discounts for the products through successful play of the game.

To implement the invention, each player is preferably provided with a terminal device, e.g., a PC, which communicates with a game server, preferably thorough the Internet. The game server runs a logic tree type application that prompts the players with decisions at each of a plurality of decision points, and responds to each player's choices by accessing an appropriate one of several database servers, and downloading information to the players. For example, in response to a player's selection, the game server may access product information from a content server, and download the product information to the player so that the player can research the information, and acquire knowledge of the products that is necessary for continued play of the game. Preferably, the content server contains sales and product availability information, technical details, cost, etc. for each of the products. The game server also keeps track of the player's progress through the game, and awards the player with points and or product discounts that can be employed by the player for purchasing a featured product at a discount price, or even winning the product, for example.

Thus, as the player proceeds through the step-by-step interactive game, they are in effect interactively interfaced with one or more commercial "infomercials" so that the player and/or participant can interact with the infomercial in a virtual reality environment, by researching and shopping for the displayed products. At each "infomercial" the retail object for demonstration or sale is preferably related to the "theme", i.e. story or plot, of each "interval location" of the game. For example, when the player and/or participant user approaches a "location interval" in the strategic game, such as a desert, a product such as PERRIER may be displayed. The product is coded so that the player and/or participant can access information about and purchase the product, such as a case of PERRIER water, to be delivered conventionally by shipping to the player and/or participant user or the player or participant can try and use the product in a virtual reality setting.

A key feature of the combined game and infomercial is the requirement that the players research and learn about the various products offered by the vendors. This feature actually comprises a four-step process of research, knowledge, retention and application. A player comes to a decision point in the game that requires that they select a product from a group of products that is suitable for the next task that the player must accomplish to advance in the game. For example, the player may be asked to select an appropriate vehicle to cross a certain type of terrain in an allotted time, using a set quantity of fuel. The player is given several vehicle choices that they must research in order to determine not only which vehicle is suitable for the task, but what options the vehicle should have (e.g., engine, transmission, tires, etc.), what speed the vehicle should be driven to avoid running out of gas, etc.

In order to complete the task successfully, the player must then not only research each of the vehicle choices to acquire the requisite knowledge, but they must also retain this knowledge and apply it correctly to the task at hand. If they try to shortcut the process, a likely outcome will be that they will fail to achieve the task by selecting a vehicle that cannot traverse the terrain due to improper tire selection, or by selecting one that runs out of gas due to excessive gas consumption. To further enhance the retention process, the game also preferably uses quizzes, riddles, etc. at certain points to test the players' knowledge of the previously researched products. Players who successfully complete a task in an allotted time, and correctly answer questions, are thus awarded points, which may be in the form of product discounts, coupons, etc. Preferably, as each player researches a vendor's product, statistical data is stored that is ultimately sent back to the vendors so that they know how much exposure their product is getting in the game, how effectively the players are learning about the features of their products, what types of players (i.e., demographics) are researching their products, etc. This information can be used to determine an appropriate subscription rate for each vendor, and can also assist the vendors in improving their products and production information.

The present invention thus provides a system and method that facilitate a unique marketing approach for the advertising and sale of goods and services that captivates the advertising audience by entertaining them with an interactive game, and rewarding them with product discounts and the like for successful research of products which they are interested in purchasing.

BRIEF DESCRIPTION OF THE DRAWINGS

This invention can best be understood in connection with the accompanying drawings in which.

DETAILED DESCRIPTION OF THE PREFERRED EMBODIMENTS

Figure 1:
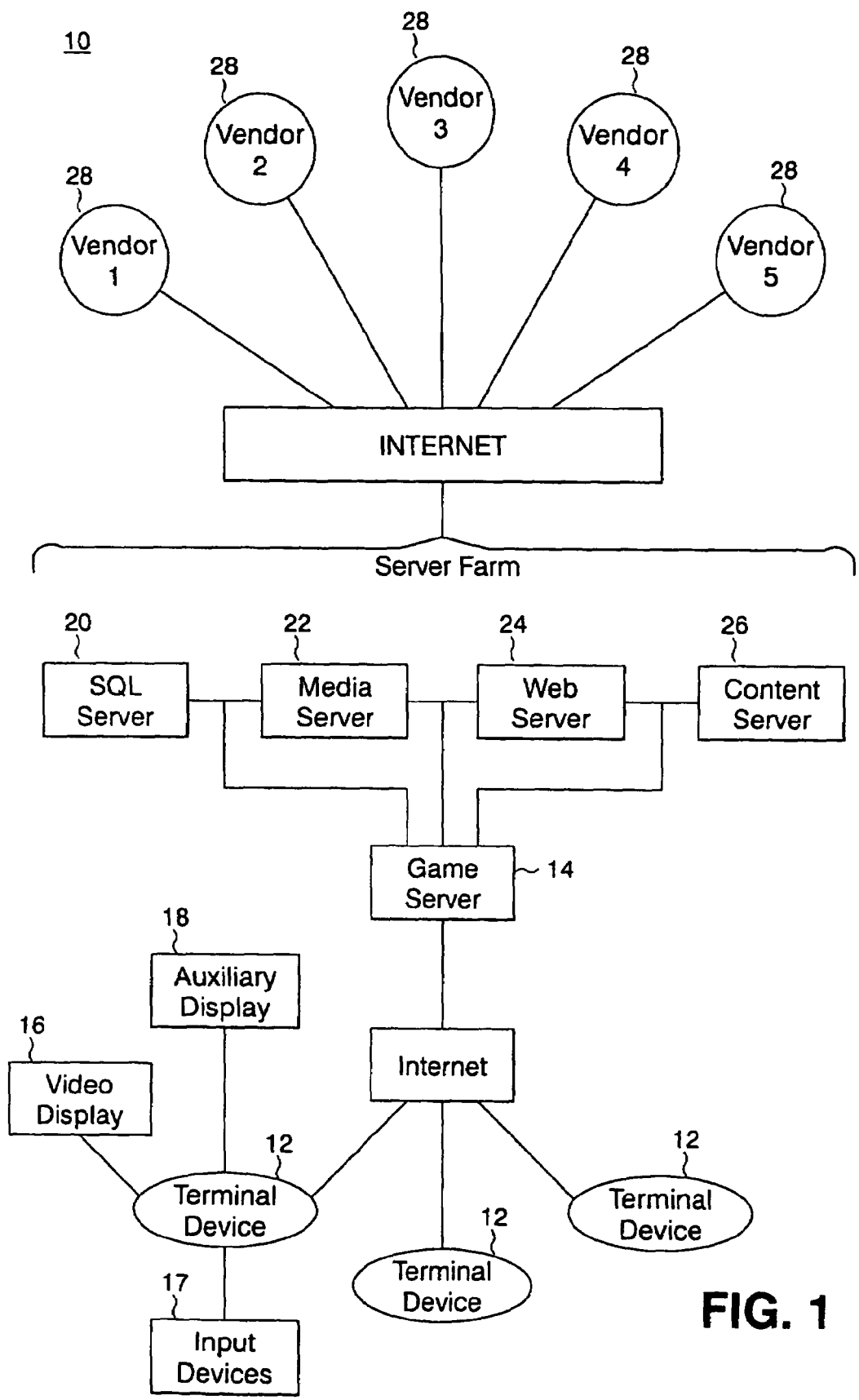
FIG. 1 is a block diagram of the hardware/software of a system for implementing a combination game and infomercial in accordance with a preferred embodiment of the present invention.

With reference to FIG. 1, a hardware/software block diagram of a combination interactive game and infomercial system 10 is illustrated that is constructed in accordance with a first preferred embodiment of the present invention. The system 10 includes one or more terminal devices 12, one for each player or participant that communicate via the Internet with a game server 14. Each of the terminal devices 12 can be for example, a PC, a PDA, a wireless communications device or a television, and includes a video display 16, and one or more input devices 18, such as a keyboard, a mouse or a remote control. Additionally, other accessory I/O devices, such as an auxiliary display 18, can be interfaced to the terminal device 16 to provide players with additional tools that can be employed to enhance game play as discussed in greater detail later. Each of the terminal devices 12 runs an application that communicates directly with the game server 14 via TCP/IP protocol. Any conventional connection architecture can be employed for connecting the terminal devices 12 to the Internet, including, for example, dial-up, DSL, cable and wireless.

Figure 2:
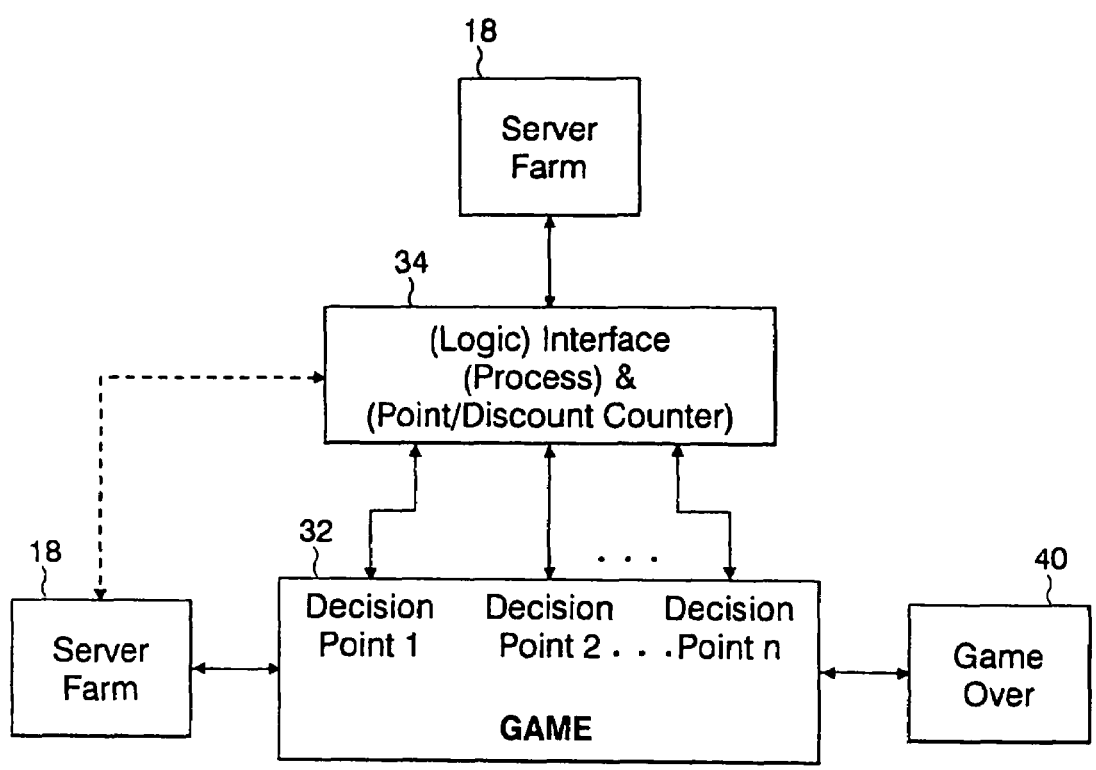
FIG. 2 flow chart showing the general operation of the combination game and infomercial of the present invention
Figure 3:
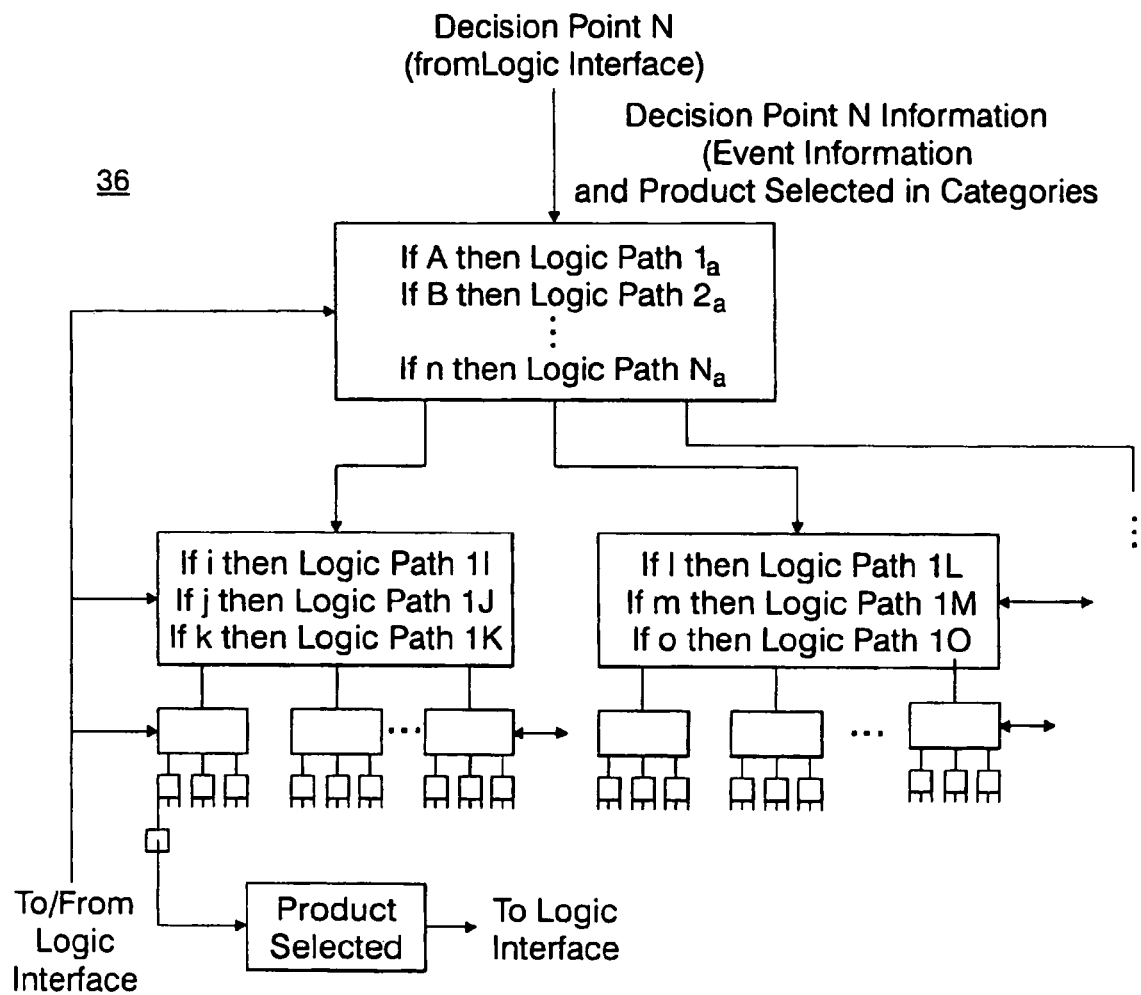
FIG. 3 is a detailed logic tree diagram that is carried out by a game server in the system of FIG. 1.

As will be discussed in greater detail in conjunction with FIGS. 2 and 3, the game server 14 controls the game session, including user validation, game tracking and content serving. To facilitate this, the game server 14 is interfaced to a server farm 18 that includes a SQL server 20, a media server 22, a Web server 24 and a caching server 26. The SQL server 20 is preferably an off-the-shelf software database server that tracks the game players' or participants' names, etc., and their progress or level in the game, including their game scores, and information pertaining to the products they research during the game. The media server 22 creates real time video and audio content, and delivers it to the terminal devices 12. The Web server 24 assembles various components and delivers them in any suitable code from, such as HTML, so that web pages may be downloaded to the terminal devices 12 as necessary to facilitate game play.

The content server 26 retrieves and stores (caches) product and service data from the web sites of each of a plurality of product and/or service vendors 28. The terminal devices 12 access this data at appropriate times during game play as will be discussed in greater detail later. It is also possible to access the product information directly from the vendors 28 when it is required, however, it is preferred that it be stored in the content server 26 to avoid difficulties that would arise if one or more of the vendors change their site content. As the players of the game research the various product descriptions, statistical information that is stored in the SQL server 20 is also sent back to the vendors 28.

It should be understood that the arrangement illustrated in FIG. 1, though preferred because of its use of the Internet, is not the only means of implementing the combined game and infomercial. For example, it is also possible to implement the game on a stand alone PC where the game and product media may be pre-recorded on compact disk, computer hard drive or other storage media. An Internet connection would still be preferred in this arrangement, however, to facilitate transfer of player statistics to the vendors 28, direct purchase of researched products after a player has concluded a game, accessing live or other media during play of the game, etc.

The game server 14 facilitates all communication with the players in the game, and invokes the appropriate one of the servers in the server farm 18 to accomplish a required task. With reference to FIGS. 2 and 3, the process by which the game server 14 operates is illustrated. First, a player 30 enters the game 32 by logging on (e.g., entering user ID and password). The game server 14 validates the player through access to the SQL server 20. Next, the video or three-dimensional animation for the game 32 is downloaded from the media server 22 to the player's terminal device 12 and video display 16.

The game 32 may be either a step-by-step strategic game where player 30 utilizes a game strategy, or a random game of chance. Preferably, the game 32 is an interactive video game in which players or participants can move through a three-dimensional animated or video world, and are presented with opportunities to amass points or discounts, research products and ultimately win or purchase products. Examples of these types of interactive video games include MYST, DARK FORCES and STREET FIGHTER. However, the present invention can also be adapted to other types of games as well, such as, for example, MONOPOLY, RISK, CHUTES AND LADDERS, etc. In any event, it will be understood that the present invention is not limited to use with any particular type of game or story, and can be used with any such game in which a player and/or participant user starts at an opening "starting decision point" and proceeds from location to location in the game.

As the game progresses, the player reaches a number of decision points where the player-participant is given clues that help them navigate to the next location. Preferably the interval location decision points of the game are visually displayed in three dimensions. The clues can be visual or directive in nature, i.e., go to desert, go to rainforest, go to Grand Central Station, go to house, go to web site, go to library, go to fantasy castle, go to information center, etc. There the player and/or participant may be given further strategic or random generated options.

A key feature of the combined game and infomercial is the requirement that the players research and learn about the various products offered by the vendors 28. As the player 30 maneuvers through the video or animation, they will eventually come to a decision point at which they must decide whether to access an infomercial or other information about a product or service in the content server 26 so that the player and/or participant can research the product to identify or locate clues to facilitate continued play of the game. In this manner, the player can actually score points or product discounts by researching and learning about the products.

Figure 4:
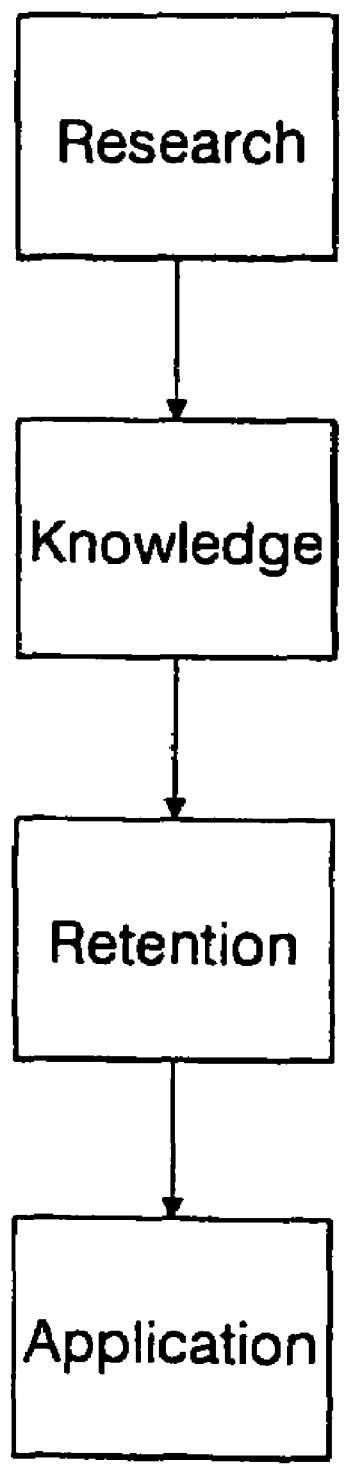
FIG. 4 is a flow chart showing the key steps that are employed by players of the game during research of a vendor's products.

This feature actually comprises a four-step process as illustrated in FIG. 4 of research, knowledge, retention and application. First, a player comes to a decision point in the game that requires that they select a product from a group of products that is suitable for the next task that the player must accomplish to advance in the game. For example, the player may be asked to select an appropriate vehicle to cross a certain type of terrain in an allotted time, using a set quantity of fuel. The player is given several vehicle choices that they must research in order to d4 termien not only which vehicle is suitable for the task, but what options the vehicle should have (e.g., engine, transmission, tires, etc.), what speed the vehicle should be driven to avoid running out of gas, etc.

In order to complete the task successfully, the player must then not only research each of the vehicle choices to acquire the requisite knowledge, but they must also retain this knowledge and apply it correctly to the task at hand. IF they try to shortcut the process, a likely outcome will be that they will fail to achieve the task by selecting a vehicle that cannot traverse the terrain due to improper tire selection, or by selecting one that runs out of gas due to excessive gas consumption. To further enhance the retention process, the game also preferably uses quizzes, riddles, etc. at certain points to test the players' knowledge of the previously researched products. Players who successfully complete a task in an allotted time, and correctly answer questions, are thus awarded points, which may be in the form of product discounts, coupons, etc.

Preferably, as each player researches a vendor's product, statistical data is stored in the SQL server 20, that is ultimately sent back to the vendors 28 so that they know how much exposure their product is getting in the game (e.g., how many players have accessed the product information), how effectively the players are learning about the features of their products, what types of players (i.e., demographics) are researching their products, etc. This information can be sued to determine an appropriate subscription rate for each of the vendors 28, and can also assist the vendors 28 in improving their product and product information.

The player thus interacts with the infomercial by joining other users remotely in a virtual reality environment, by observing the products remotely, or, by shopping for the displayed products by Internet. When the player 30 makes a selection from a group of product choices, for example, their selection is entered into a logic interface 34 in the game server 14. As illustrated in FIG. 3, the game server 14 runs a logic tree based application 36 that processes the selection information entered by the player 30, and includes a counter 38 for counting and accumulating items of value, such as points or discounts, which have been accumulated by the player 30.

At each decision point, 1 2 . . . n, the player 30 must exercise discretion and either proceed further to other decision points, or else access the inventory of various products and services contained in the content server 26, and presented in the infomercial portion of the combined game and infomercial of the present invention. The player 30 perceives information about certain thematic events of the game, plus product selection and product category information. The player 30 may use virtual reality techniques to sample a product virtually, such as test driving a motor vehicle, or the player 30 may actually negotiate for the purchase of the product in question. Then player 30 encounters further logic paths 1I, 1J, 1K, etc., until the plurality of all the logic paths are complete and a product or service is selected or declined, at which decision point player 30 proceeds to the next, subsequent decision point of the game 32 until the last decision point "n" is reached. In this manner, the game continues with the player 30 being awarded points and discounts as they research products, answer questions about the products, etc. until the game is over at end point 40.

At each "infomercial" the retail object for demonstration or sale is preferably related to the "theme", i.e. story or plot, of each "interval location" in the interactive game. For example, in the simulated "desert", PERRIER might try to sell a case of PERRIER water. In the rainforest, SPEEDO might demonstrate and/or sell swimwear. In a mountain scene, RANGE ROVER might demonstrate or sell a motor vehicle or other product through a maze or other interval location. Thus, when the player and/or participant approaches a "location interval" in the strategic game, such as a desert, a product such as PERRIER may be displayed. The product is coded so that the player and/or participant can access the product, such as a case of PERRIER water, to be delivered conventionally by shipping to the player and/or participant, or the player or participant can try and use the product in a virtual reality setting. The player and/or participant user can use the input device(s) 18 to selectively tailor his or her order, and also to view and examine the products to be purchased.

Numerous additional features or alternatives may also be provided in the invention, which include, but are not limited to, the following. Although the game preferably involves player strategy and skill, the game may alternatively include or be a random game of chance, wherein the player moves by random chances from one interval location to other interval locations, and then exercises various decisions at decision points regarding accessing product demonstrations or actual purchase or products from a database.

Preferably, the player and/or participant can also acquire purchasable items also by amassing "points" such as by trading, barter of acquired objects of value (similar to a user redeeming coupons after playing a game at a retail establishment).

The infomercial can also include opportunities of chance so that the player and/or participant can try and win a product as opposed to purchasing the product. A prize redemption system is then provided, including a prize or product list with a plurality of prizes available to be won by playing the strategic game. Prize credits can be also utilized and awarded to each player and/or participant. Furthermore, the system can also be enhanced by being coordinated with product dispensers, so that a purchaser can be given a credit slip to use in purchasing products at a later location.

Although it is anticipated that the strategic game be "one on one," i.e., one player and/or participant user playing alone, it may also be a multiple player game with a group of players and/or participants playing remotely, like many people using "HOME SHOPPING NETWORK" type of purchasing or auction. In this arrangement, video or digital cameras may also be used to show all of the remote players and/or participant users to other remote participants or players. In the event that the selected game is one of skill, there may be different skill levels available in case a player wishes to play the strategic game with harder and more difficult intervals than in a basic game. The remote players and/or participants can be grouped as to skill level or age, to separate children from adults, so that each player and/or participant user player competes only against players having a similar skill level or age. Also parental permission is required for children's play or purchasing of toys, etc.

The present invention allows a player and/or participant to purchase goods displayed in the combination strategic game and infomercial at a remote location, such as at home. The game server 14 downloads images of the products from the content server 26 to the terminal devices 12, and can keep track of the products in a remote distribution center.

The infomercial may also be non-commercial, such as an educational, interpersonal, subliminal or other value-imparting project. In a non-commercial setting, such as a stress relaxation project, the participant and/or player can, at various decision points of the game, access information about relaxation techniques, such as how to replace muscularly stressful chest breathing with relaxing abdominal breathing.

A key point is that the game is preferably played remotely even though a player is not present at the site of the infomercial. Player preferences and/or rejections are stored in a central database file in the SQL server 20, so that even if a player and/or participant does not select an available product or random generated award or prize at an interval location decision point of the game, the player and/or participant can follow-up later with other selections in the game to try and again entice the player and/or participant at a later interval location decision point of the game.

Figure 5:
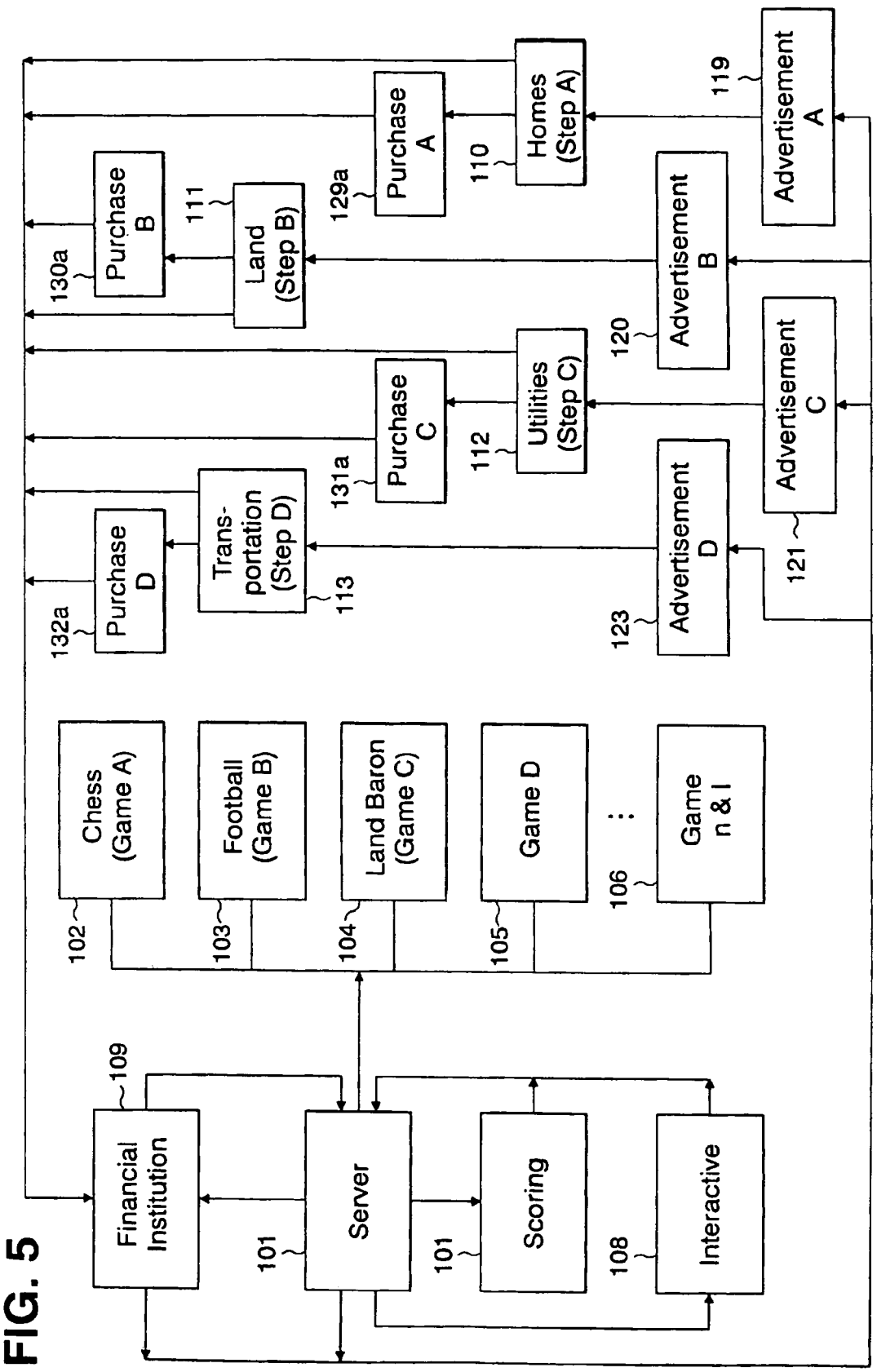
FIG. 5 is a flow chart of another embodiment for a combination multi-media interactive strategic game and video infomercial of the present invention.

FIG. 5 illustrates another embodiment of the present invention that can be employed for playing a plurality of different games in combination with infomercials or advertising. A system game server 101, such as an Internet server, a computer hard drive or compact disc or other means of communication, provides a user with a choice of various strategic or random games 102, 103, 104, 105 and 106. In this example, the reference numeral 102 represents a game "A" such as chess, reference numeral 103 represents another game "B" such as a football game, reference numeral 104 represents a land baron acquisition type game "C", reference numeral 105 represents a further game D, and reference numeral 106 represents other games, which are all provided by server 101 to the user.

There is also provided a scoring means 107 which is controlled by the server 101 and an interactive graphic mode 108, both of which provide strategic rules and graphics to the user. However there is a further subset of the server 101, namely a financial institution 109 which supervises financial transactions between the player or participant and the server 101, whenever the player is presented with an infomercial type of sales solicitation at any number of intervals in the selected game.

For example, if the player chooses the "Land Baron" type game C (shown as reference number 104) the player is then presented with a series of optional interval location or step decision points in the game, such as a step 110, pertaining to purchase of property or buildings; step 111 that relates to the purchase of land; step 112 that relates to acquiring power such as from a utility; and step 113 that provides a transportation mode.

Each of these steps A, B, C, D shown as reference numerals 110, 111, 112 and 113, are then further connected to advertisements 119, 120, 121, 122, which are appropriate for each interval location of the various steps. For example, if one is showing a desert scene then the advertisement might be from a provider of bottled water. So in effect the player, at these various interval locations, carries out the strategic games sequentially in whatever order at these various locations. Optionally, the game may be a random game of chance with random advancements to interval locations. Then the player is presented with one or more sales opportunities so that the graphics and plot line of the game are intertwined with the advertisements. In effect, the system provides a simulated created "infomercial" wherein the player goes from step to step of a chosen game and then is presented with various sales opportunities as in an infomercial.

The user then has the opportunity to observe products or to make purchases such as purchases 129*a*, 130*a*, 131*a*, and 132*a* corresponding to the advertisement 119, 120, 121, and 122 which also correspond to games steps 110, 111, 112 and 113, respectively.

Each of these product demonstration or purchase steps are then connected back to the financial institution 109, which can provide a clearing house means for connecting an advertiser to a credit card or other type of acquisition redemption means for the user to use a credit card or other means of payment to obtain goods or services shown in advertisements 119, 120, 121, and 122 at game steps 129, 130, 131, 132.

Thus, in the shopping mode at each various interval location decision point, the player is presented with a display of a virtual shelf of products which are generally related to the various intervals or steps of the game. The product database is connected with the financial institution 109 so that the player can browse and shop through various products o the advertisers and complete any financial transaction through the financial institution.

Each product is then identified by an identification means wherein a further file contains the identification mean so that the player can access the products and images thereof as well as select various products from a category or products. The player can also have means for retrieving information describing the selected products including visual displays thereof.

As discussed previously, the preferred type of game with which the present invention is employed, is a video or three dimensional animation type game in which a player passes from one scene to another during game play. One optional, though preferred, feature of the game is to provide a visual means by which a player may advance through the game faster through access to clues that are not readily visible in a particular scene. Such clues may be accessed, for example, by using a simulated optical aid, such as a telescope, magnifying glass, 3D glasses, etc. or an auxiliary input or output device, such as the auxiliary display 18, to enable a player to see something in a particular scene that they could not otherwise view. For example, using a simulated telescope, a player could view a map on a wall of a room in a building many blocks away, and discover a clue about a product that they are researching.

Figure 6:
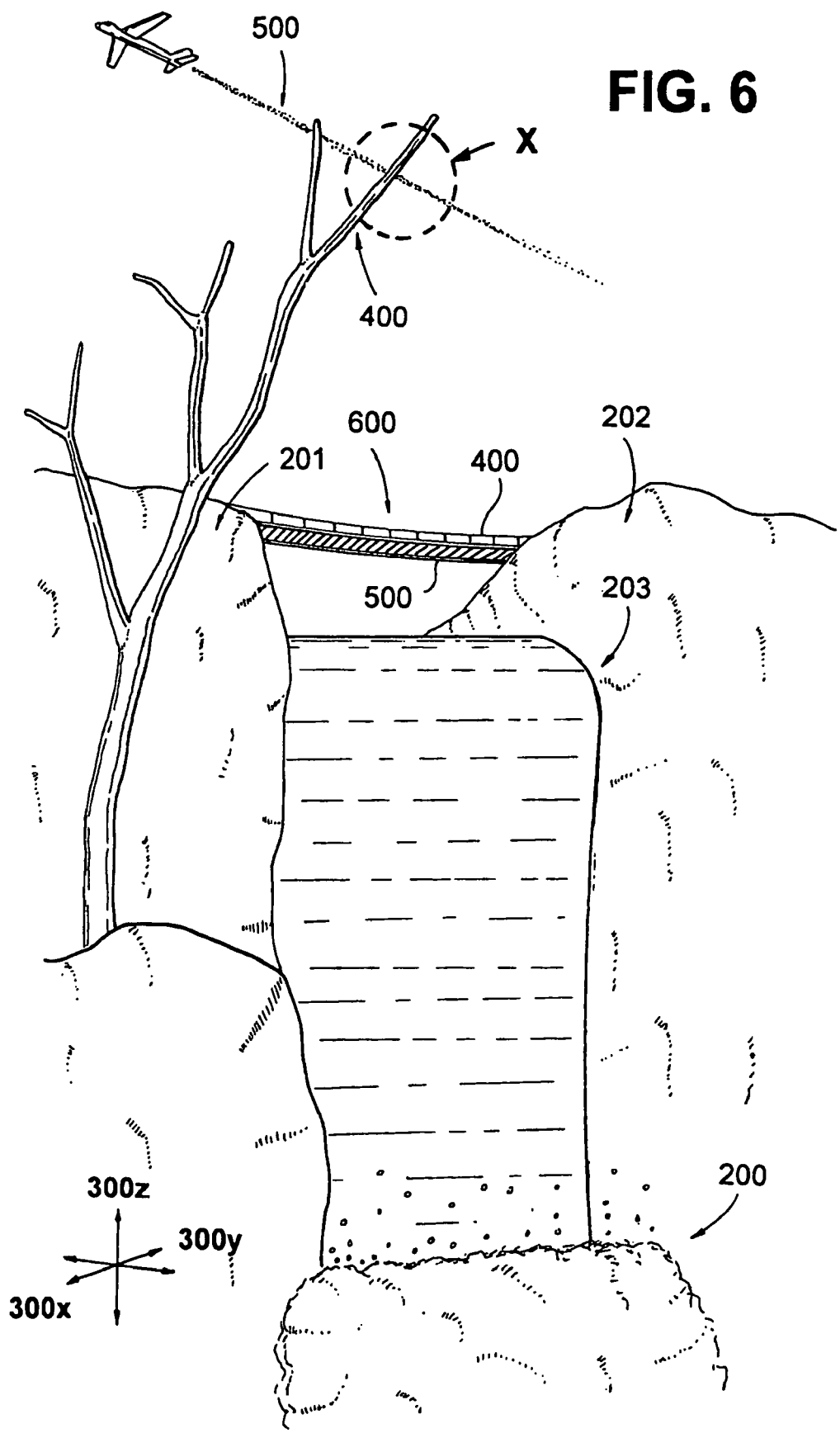
FIG. 6 is a diagrammatic perspective view of an optical geometric embodiment of the present invention.

Other visual concepts that can be employed in assisting the player during game play are illustrated in FIG. 6 that shows a diagrammatic perspective view of an optical geometric embodiment where the user can interactively proceed through selected optical three dimensional geometric oriented locations, such as flying in flight air travel, hiking ravines and gorges, scuba diving in oceanic submerged mountain ranges, experiencing stalagmite decorated caves, etc. At each location, such as gorge ravine 200, the visual field displayed to the participant user is divided up into discrete segmented locations 300$x$, 300$y$, 300$z$, such as a cubic grid in x, y, z three dimensional axes. At each location denoted by coordinates 300$x$, 300$y$, 300$z$, the user can choose to advance further in the game by moving discrete units of information, such as lines, curved shapes such as circles or ovals, or intersected lines, and use these discrete units of information to expand upon and overlay them upon the three dimensional geometric oriented location. Thus, while interactively descending hiking steps within a virtual gorge 200 having imaginary high cliffs 201, 202 divided by a waterfall 203, the user can build a virtual bridge 600 with linear lines 400 and/or 500 across the gorge 200 to proceed further in the game.

In addition, clues indicating how a player should proceed next may be embedded in the scene. For example, a portion of a tree branch 400 can be accessed as a linear unit, and intersected with a linear jet exhaust stream 500, to produce an "X", shown encircled. This "X" can be placed at strategic locations within the three dimensional grid to further advance the game by identifying, for example, a location where the use of a visual aid will uncover clues, rewards, game points or commercial advertisements.

Although the invention has been disclosed in terms of a number of preferred embodiments, and modifications thereon, it will be understood that addition modifications and variations could be made without departing from the scope of the invention as defined in the appended claims.

I claim:

1. An interactive game comprising a centralized processing in order to process strategic or random scoring and interactive game information together with financial information, said centralized processing having a plurality of games for choosing by a user wherein each game has a plurality of step interval locations, said step interval locations communicating with at least one product placement advertisement displayed upon a display device having a screen at each step of the game, wherein the user uses a provider to facilitate purchasing or demonstrating a product online from the server during the course of a strategic or random game, wherein the user interactively proceeds through selected optical three dimensional geometric oriented locations and wherein at each location, the visual field displayed to the user is divided up into discrete segmented locations in x,y,z three dimensional axes, wherein further at each location, the user advances further in the game by moving discrete, geometric or optical units of information to expand upon and overlay them upon the three dimensional geometric oriented location, whereas the user selects at least one most appropriate product displayed, to use and manipulate images to sample and try out said selected product on said screen during a story line plot of said interactive game.

* * * * *